United States Patent [19]

Streisel et al.

[11] Patent Number: 5,587,048
[45] Date of Patent: Dec. 24, 1996

US005587048A

[54] PULP AND PAPER PRODUCTS PRODUCED FROM RECYCLED, HIGH LIGNIN CONTENT, WASTE PAPER

[75] Inventors: Robert C. Streisel, Mt. Pleasant, S.C.; Mark A. Hank; Leo T. Mulcahy, both of Covington, Va.; Ralph S. Peterson, Clifton Forge, Va.

[73] Assignee: Westvaco Corporation, New York, N.Y.

[21] Appl. No.: 616,762

[22] Filed: Mar. 15, 1996

Related U.S. Application Data

[60] Continuation of Ser. No. 216,448, Mar. 23, 1994, abandoned, which is a division of Ser. No. 21,662, Mar. 9, 1993, abandoned, which is a continuation-in-part of Ser. No. 862,996, Apr. 6, 1992, abandoned.

[51] Int. Cl.⁶ ........................................ D21C 5/02
[52] U.S. Cl. .................. 162/7; 162/8; 162/100; 162/147
[58] Field of Search ........................ 162/4, 5, 7, 8, 162/55, 100, 147

[56] References Cited

U.S. PATENT DOCUMENTS 4,737,238  4/1988  de Ruvo ........................ 162/4
5,147,503  9/1992  Nguyen ......................... 162/7
5,538,594  7/1996  Hank et al. .................... 162/7

OTHER PUBLICATIONS

Kanazawa "Recovery of Unbleached Kraft Pulp from AOCC . . . Bleached Kraft Pulp" Nov. 1988.

Aikawa et al "Processing OCC, Deinking, Approach Flow Screening" World Pulp & Paper Technology 1990, pp. 102–105.

*Primary Examiner*—Karen M. Hastings
*Attorney, Agent, or Firm*—Dennison, Meserole, Pollack & Scheiner

[57] ABSTRACT

A method is disclosed for producing, in a continuous throughput, high quality paper from recycled waste paper utilizing high consistency, low shear pulping, followed by a series of cleaning steps to produce a wet, friable pulp which is digested and optionally bleached. The resulting pulp can be run on a paper machine alone or blended with virgin pulp to produce a paper containing at least 5% by weight recycled paper with less than 20 ppm per unit area solid non-fibrous contaminants larger than 0.3 mm², and which may be blade coated on a high speed paper machine. The pulp and paper produced by the methods are also disclosed.

5 Claims, 6 Drawing Sheets

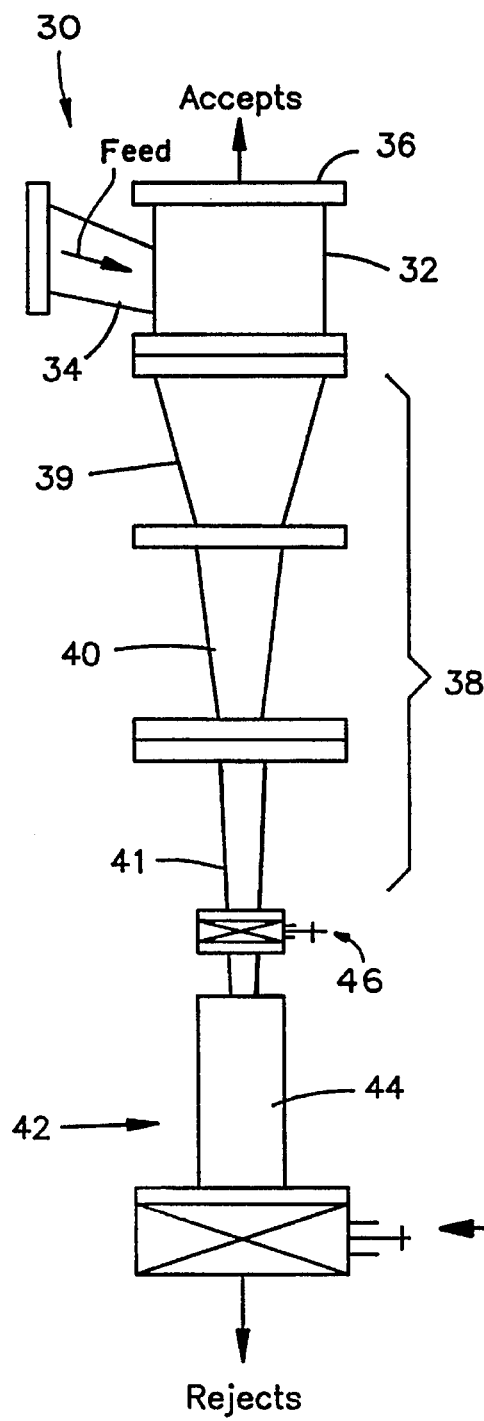
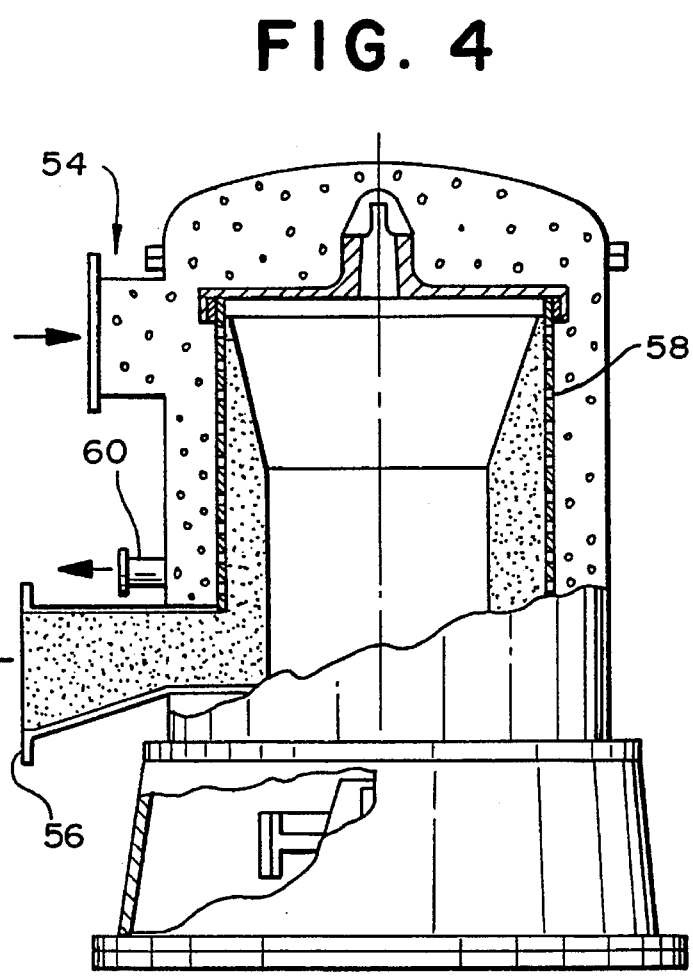
FIG. 3
FIG. 4

PULP AND PAPER PRODUCTS PRODUCED FROM RECYCLED, HIGH LIGNIN CONTENT, WASTE PAPER

This is a continuation of application Ser. No. 08/216,448 filed on Mar. 23, 1994, now abandoned, which is a divisional of application Ser. No. 08/021,662, filed Mar. 9, 1993, now abandoned, which is a continuation-in-part of application Ser. No. 07/862,996, filed Apr. 6, 1992, now abandoned.

BACKGROUND OF THE INVENTION

1. Field of the Invention

The present invention relates to papermaking and the use of high lignin content recycled fiber sources as furnish for bleached kraft paper and paperboard.

2. Description of Related Art

Bleached kraft paper and paperboard are utilized to package food and other sanitation sensitive products. In many cases, food, drugs and other products intended for human consumption or use in intimate contact with a human body are packaged in direct contact with respective paper or paperboard enclosures. Consequently, most manufacturers and producers of such paper and paperboard maintain food grade production facilities and procedures. Only food grade additives are combined with natural fiber furnish to lay such paperboard.

Concern for sanitation and chemical contamination in the papermaking process has, in the recent past, greatly restricted acceptable fiber sources to substantially virgin fiber and the waste of a very few, strictly controlled, paper converting plants. Such concern for biological and chemical contamination has contributed to a virtual abstention from using post-consumer waste paper as a fiber supply for bleached paper and paperboard.

However, biological and chemical contamination concerns are not the only prior art restraints from recycling post-consumer waste paper into bleached kraft paper and paperboard. The mass dominance of post-consumer paper collected for recycling is high yield material having less than half of the naturally present original lignin removed by respective digestion/delignification procedures. For example, newsprint, typically, is mechanically ground wood having no native lignin content removed. Typical corrugated container board is 75–80% yield material. Consequently, bleaching costs for old corrugated containers (OCC) are extremely high in comparison to virgin material processing thereby exacerbating the adverse environmental impact of fiber bleaching.

Additionally, post-consumer waste paper fiber is thoroughly laced with metal fasteners, plastic film coatings, adhesives, heavy metal dyes and ink pigments, all of which must be removed prior to any attempt to reform a new paper web from such fiber.

The high quality paper and paperboard products used for packaging, especially food packaging, are blade coated on a high-speed paper machine, operating in a range of at least, e.g. 800–1200 ft/min. Blade coating produces a superior finish, but the process is extremely sensitive to contaminants, especially plastics and stickies. Plastics and stickies present in the paperboard become lodged under the blade and produce streaks and scratches during coating. In addition, contaminants lodged under the blade cause coating to be splashed onto adjacent equipment causing scale buildup. The scale quickly builds to a level where small bits of dried coating break off and fall onto the paperboard below, becoming lodged in the finished reel. When this material reaches the customer's converting operation the result can be disastrous, with bits of coating deposited on offset blankets and gravure cylinders, causing poor print quality for the entire converting run.

Thus, blade coated paperboard having a significant level of contaminants, e.g. above 20 ppm, is essentially unsalable. For this reason, old corrugated containers (OCC) with high contaminant levels have been viewed as a highly unlikely source of recycle material for producing blade coated paperboard. The corrugated portion of such materials is often made from "reject" hardwood pulp, i.e. pulp too dirty to be used for other purposes.

The economics of paper production generally dictate against the use of secondary recycle fiber sources in the production of high quality bleached kraft paper and paperboard. However, economics alone no longer strictly control the production of paper, as consumers have become aware of the environmental impact of paper production and disposal, and have begun demanding recycled fiber content in the packaging for the products they purchase. It has therefore become imperative that methods be developed for incorporating recycled fiber in high quality paper products in spite of the cost and difficulties in doing so.

Several schemes are known in the art for recycling corrugated paperboard, focusing mainly on the cooking procedure. Thus, Japanese Published Application JP-A-57/167,475 discloses alkaline digestion at 130°–170° C., followed by blowing at a temperature of less than 100° C., removal of foreign matter and bleaching. The bleached pulp which results can be used in printing grade paper. A related application is Japanese Published Application JP-A-57/16,990.

U.S. Pat. No. 5,147,503 is also concerned primarily with the digesting operation, disclosing digesting with an aqueous alkaline cooking liquor containing sodium sulfide at 160°–180° C. The '503 patent also discloses an initial pulping and cleaning process including "dry pulping" (20–30% solids) with some removal of contaminants, followed by dilution to 3–4% solids, screening and centrifuging. The aqueous pulp mix is then dewatered and digested. The final product in the '503 patent is described as pulp suitable for bleaching to produce white paper products.

These references do not disclose, for example, the production of high quality, blade coated paperboard containing recycled material.

It is therefore an object of the present invention to provide high quality, blade coated paper and paperboard containing recycled material, especially recycled corrugated paper.

It is also an object of the present invention to provide an economical process for recycling high lignin paper fiber into bleached kraft paper and paperboard.

Another object of the present invention is to teach a process for recycling high lignin paper fiber from post-consumer sources into sterile bleached kraft paper and paperboard.

Another object of the present invention is to teach a process for separating natural wood fiber from a miscellany of contaminants present in post-consumer waste paper.

SUMMARY OF THE INVENTION

These and other objects of the invention are achieved by a paper recycling process in which a substantially complete removal of solid contaminants is performed before digestion. In order to remove the contaminants, slurrying of the recycled material is deliberately performed in a manner which removes the solid contaminants from the fibers, but does not break up the solid contaminants. This is a significant aspect of the process of the invention.

This process results in a pulp of purity comparable to pulp produced from virgin fiber, a significant achievement heretofore thought to be unattainable as part of a large scale, essentially continuous, high output papermaking operation. The process of the invention is capable of producing, on a commercial scale, a pulp for digestion which is substantially free of solid, non-fibrous contaminants greater than 0.3 mm$^2$. Contaminants of size 0.3 mm$^2$ and smaller are generally not distinguishable from fiber and do not affect paper production.

The pulp of the invention can be run on a paper machine by itself or in any combination with virgin pulp to produce a paper containing less than 20 ppm per unit area solid non-fibrous contaminants of size greater than 0.3 mm$^2$, preferably less than 20 ppm of size greater than 0.1 mm$^2$, and more preferably less than 20 ppm of size greater than 0.05 mm$^2$. With contaminants of greater than 0.3 mm$^2$ below the 20 ppm level the paper is capable of being satisfactorily blade coated at high paper machine speeds, without streaking and scratching.

The process of the invention thus involves slurrying waste paper at high consistency, 9–15% by weight, and preferably 10–13%, in a low-shear mixer at low temperature, below 65.5° C. (150° F.), preferably below 60° C. (140° F.) and most preferably below 49° C. (120° F.), to prevent melting of plastics, hot-melts, and adhesives. Subsequently, the pulp is passed through a series of cleaners for contaminant removal. The basic cleaning sequence is as follows:

1) Detrashing

The detrasher contains 6mm (¼ inch) holes and retains large contaminants, such as plastic bags, pieces of wood, large staples, pieces of metal and packing tape. Detrashing typically takes place at 3–5% solids.

2) High-Density Cleaning

Heavy, coarse contaminants, such as bolts, staples and rocks are removed. High density cleaning typically takes place at about 3–4% solids.

3) Primary Coarse Screening

Primary coarse screens contain holes 2–3 mm in size, preferably 2.4 mm, for removing medium-sized contaminants, such as small fragments of wood, tape and styrofoam. Coarse screening at this stage protects fine slotted screens downstream from being overwhelmed by contaminants that are large relative to the slot width, and results in improvement in quality and production rates. Coarse screening typically takes place at about 2.5–3.5% solids.

4) Secondary Coarse Screening

The rejects from the primary coarse screening may be screened again using holes of the same size, but at a lower consistency, about 1.5–2.5% solids.

5) Sand Cleaning (Centrifugal)

Sand cleaning at this stage protects the fine slotted screens downstream from excess wear. Waste corrugated paperboard contains relatively large amounts of sand. Cleaning ahead of the screen increases the cost of the system, and increases the requirements for hydraulic capacity. Sand cleaning typically takes place at about 1% solids.

6) Screening

Fine slotted screens are used with a width of 0.008 inch (0.20 mm), rather than 0.012 inch previously used for corrugated paperboard. The fine screens remove plastic slivers, wax and stickie agglomerates. Screening takes place at less than 1% solids, preferably less than 0.9%.

7) Lightweight Cleaning (Gyrocleaning)

Lightweight cleaning preferentially removes materials with a specific gravity below 1.0, such as plastics, waxes and stickies, not heretofore removed. Lightweight cleaning is performed at about 0.8% solids.

The mechanically cleaned and screened recycle pulp is dewatered to an approximate 30% to 60% consistency slurry for digester loading. The cooking of the recycle pulp is preferably done with kraft cooking liquor (white liquor), sodium hydroxide and sodium sulfide. Concentration and cooking time are varied as is known in the art. Cooking intensity is roughly coordinated with the average yield of the waste paper source material. The object is an 18–24K Number bleaching pulp. Wood chips are normally cooked to a 50% yield as preprocessing for an 18–24K Number pulp. If the waste paper source has been cooked at all, obviously it would not be necessary to cook the waste paper as hard as raw wood chips. For example, if the post consumer fiber sources selected for recycle correspond to a 75% yield pulp, a subsequent digestion, also of 75% yield, will provide a 50% final or overall yield pulp which roughly corresponds to an 18–24K Number pulp having approximately 93–95% of the lignin removed that was originally present in the wood. Bleaching removes the final 5% to 7% of the original lignin.

Other delignification processes such as oxygen and ozone treatments may be used in combination with or in lieu of kraft digestion assuming compatibility with a matching chemical recovery system wherein extracted lignin is burned as a steam generational fuel.

Following digestion or delignification, the pulp is separated from the liquor, and may be treated according to processes known in the art for preparing digested pulp for adding to a paper machine, including bleaching and additional screening steps, as desired.

BRIEF DESCRIPTION OF THE DRAWINGS

FIG. 3 is a side view of a high density cleaner;

FIG. 4 is a cross-sectional view of a coarse screening device;

DESCRIPTION OF THE PREFERRED EMBODIMENTS

Fiber sources suitable for recycling pursuant to the present invention may include corrugated box plant clippings characterized as double liner kraft (DLK) and postconsumer packaging such as old corrugated containers (OCC), kraft bagging, newspapers, newsprint, telephone directories, etc. Although the industry makes generic distinctions between paper and paperboard, such distinctions are generally based on sheet thickness or caliper. Such art distinctions between paper and paperboard are of little or no significance to this invention, and consequently, the singular term "paper" will hereafter be used to describe both paper and paperboard. Common to all these paper sources is the presence of a high lignin content, the fibers having been either not cooked at all or only partially delignified by cooking. On the average, such paper sources are the products of 65% to 100% yield pulp. Typically, less than half of the native lignin has been removed.

As a post-consumer product, high lignin kraft paper has been combined with plastic film, a myriad of adhesive compositions, metal fasteners, binding wire and countless other physical, chemical and biological contaminants including those known in the art as "stickies", contaminants such as hot melts, pressure sensitive adhesives, styrofoam, lattices, waxes, and similar materials that have a tendency to adhere to or deposit on paper machine equipment such as forming fabrics, press felts, dryer felts, dryer cans and coater blades. As a first step toward separating natural fiber from such contaminants, the recycle material is slurried with quantities of aqueous fluids and under conditions which will separate the solid contaminants from the fiber without degrading the contaminants.

The descriptive phrase "aqueous fluids" is intended to encompass all suitable water mixtures and solutions such as paper machine white water and brown stock wash water known as broke liquor. Of course, clean water may also be used, and these fluids will be described simply as "water."

Predominately, such recycle material is received by a paper mill in dry, compacted bales. The recycle paper bales and water are combined in a large, open vessel having one or more powered agitation blades rotating about a vertical, conical axis. The combined action of water saturation and mechanical shearing and stirring frees the fiber from such gross physical contaminants as binding wire, metal fasteners, tape and some plastics. Although repulping is normally perceived as continuous processing, it may be preferable to operate the equipment in a semi-continuous mode or as batch or increment processing.

Figure 2A:
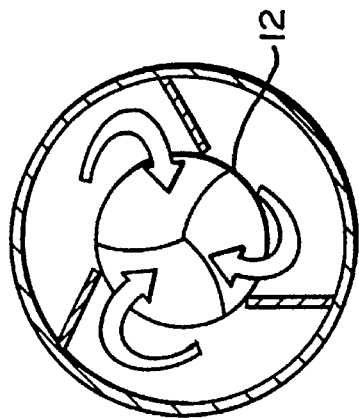
FIG. 2a is a plan view of the pulper of FIG. 2.
Figure 2:
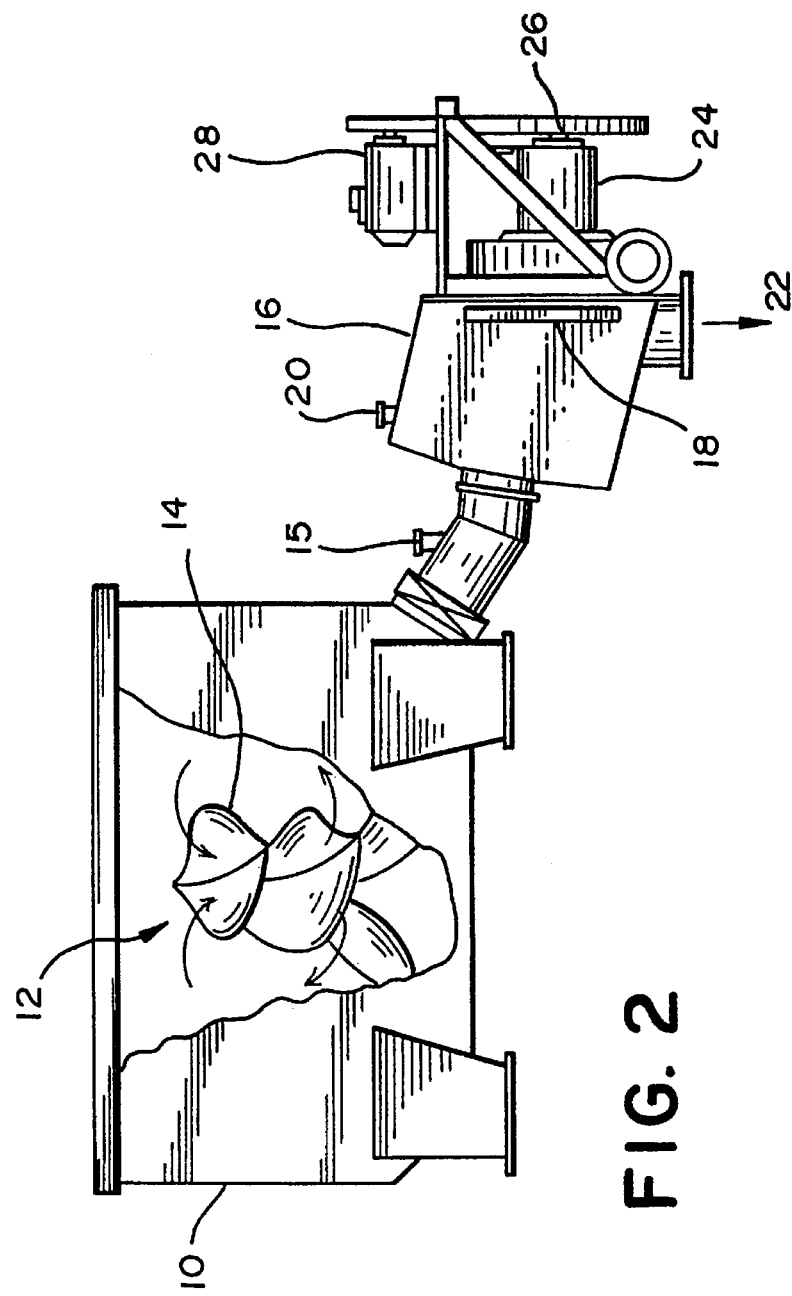
FIG. 2 is a cross-sectional view of a batch pulper useful in the invention, together with a coarse cleaner.

The pulping step must be carried out in a manner which separates the fiber from the solid contaminants without degrading the solid contaminants. A suitable apparatus for carrying out this stage is a high consistency batch pulper, of the type represented by a Helico batch pulper 10 shown in FIG. 2, which circulates the stock with a high surface area rotor 12 with multiple, broad surfaced, helical vanes 14, causing a fiber-to-fiber shearing action. The arrows in FIGS. 2 and 2a show the desired circulation pattern in the pulper. A significant aspect of the invention resides in the fact that pulping takes place at a consistency of about 9–15%, by weight, or high density, preferably about 10–13%, and most preferably about 12%.

When the fibers of the waste paper are sufficiently disassociated, the stock is diluted with aqueous fluid to 3–5% by weight consistency by means of dilution line 15. The diluted pulp passes to detrasher 16 including a plate 18 having 6 mm holes. Air is removed through port 20 and separated trash removed through drain 22, after each batch. Detrashed pulp passes through the plate 18 and exits into line 24. The interior of the detrasher includes a rotor 26 driven by motor 28, the rotor operating a blade (not shown) which cleans the plate.

Operation of this type of pulper in combination with a cleaner in a recycling operation is described in U.S. Pat. No. 4,604,193.

The pulp passes next to high density cleaner 30 shown in FIG. 3, which removes any large, heavy contaminants which might have passed through plate 18, e.g. tacks and metal fragments. Cleaner 30 is divided into 3 sections, an upper section 32 including feed inlet 34 and accepts outlet 36, a middle section 38 including three cones 39, 40, 41, and a lower section 42 with junk box 44 wherein foreign reject material collects for discharge. Stock feeds into the cleaner inlet through a triangular conical pipe 39 in a cyclonic downward flow. Around the middle of the bottom cone pipe 41, the stock is balanced with fresh water from inlet 46. The fine stock is forced upward by the balance water through the middle of the cyclonic flow and out the cleaner outlet. Heavy foreign material contained in the stock is gathered on the inside wall of the cone pipes by the centrifugal force generated by the cyclonic flow. These materials separate from the flow at the balance point and drop down into the junk box. At the top and bottom of the junk box, automatic valves are provided to permit automatic periodic discharge of the contaminants that have accumulated. The top valve closes to isolate the junk box, and the bottom valve opens to dump the accumulated material. The bottom valve then closes and the top valve opens until the next dump cycle.

Figure 1:
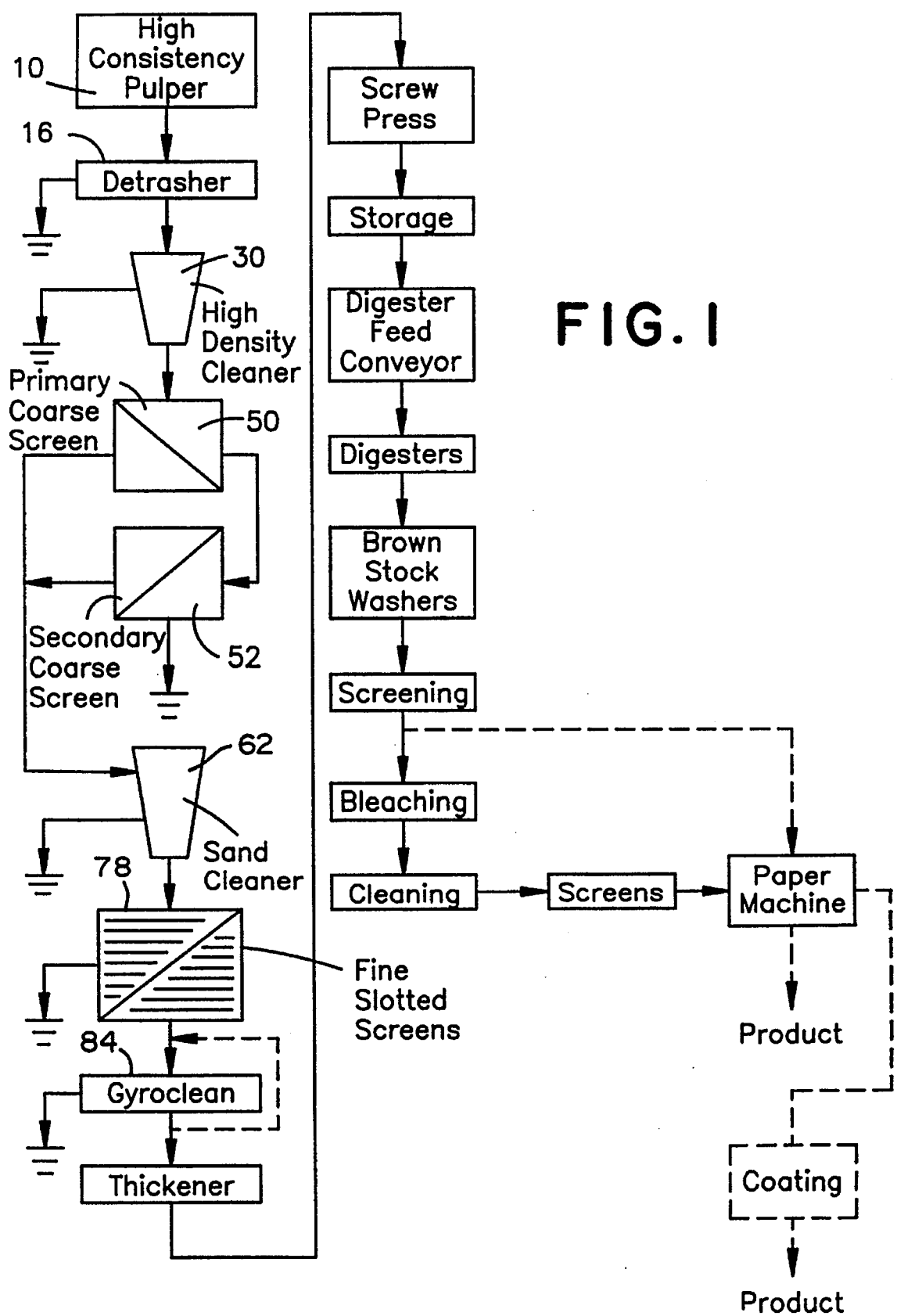
FIG. 1 is a material flow and process schematic representing the type of equipment that is or may be used to practice the present invention.

Primary and secondary coarse screens are located downstream of the high density cleaner. As shown in FIG. 1, primary screen 50 removes plastics, stickies, shives and other small contaminants. Rejects from primary screen 50 are passed to secondary screen 52 which removes fibers. The outputs of primary screen 50 and secondary screen 52 are combined.

The primary and secondary screens may be identical in structure and a typical configuration is shown in FIG. 4. These screening devices include an inlet 54, a fiber outlet 56, a screen 58 having openings in the form of holes of 2–3 mm, and reject outlet 60.

The coarse screens operate at a slightly lower consistency than the detrasher and high density cleaner. Thus, the primary screen operates at about 2.5–3.5% solids and the secondary screen operates at about 1.5–2.5% solids.

One or both of the coarse screens may be in the configuration of detrasher 16 shown in FIG. 2, utilizing a flat plate with holes 2–3 mm in diameter. This configuration is often preferred, as the blade cleaning the plate enables an increase in throughput of stock, and reduces downtime for cleaning.

Figure 5:
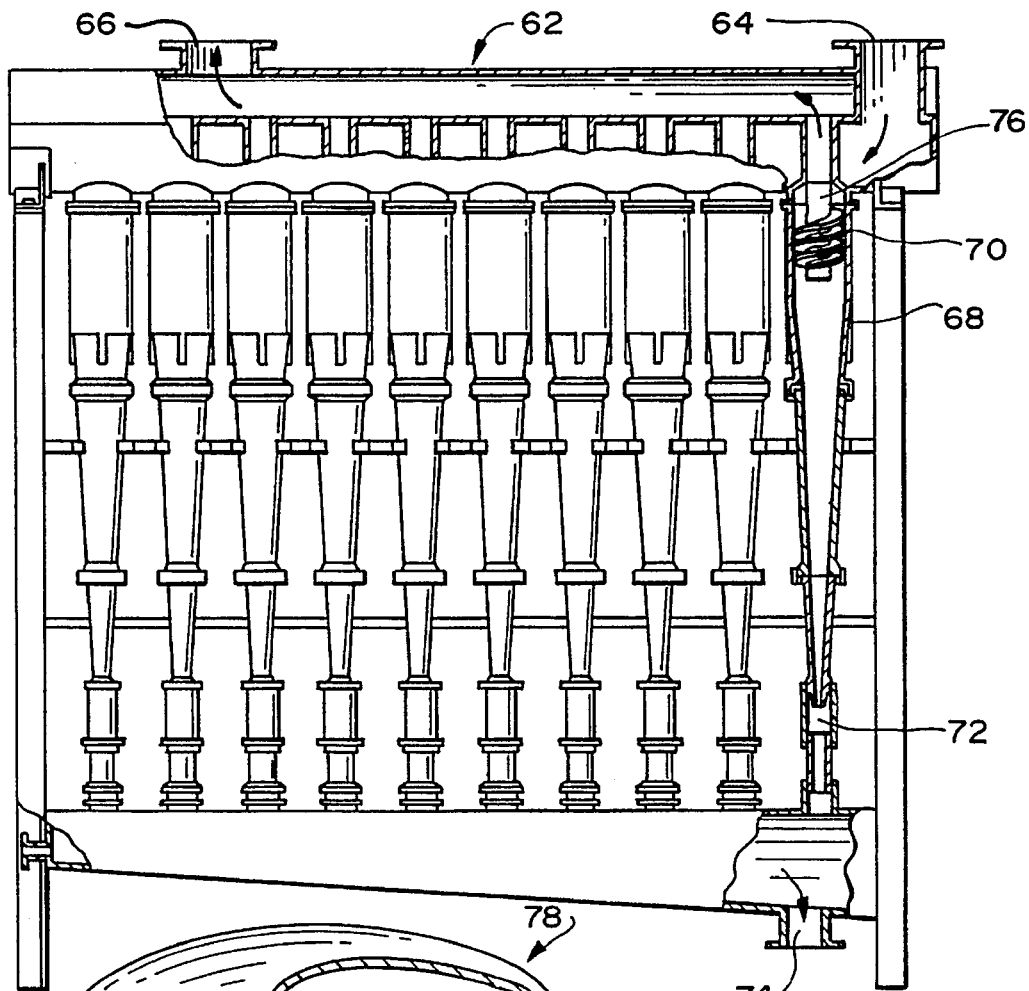
FIG. 5 is a cross-sectional view of a sand cleaner.

A sand cleaner 62, shown in FIG. 5, is disposed downstream of the coarse screens. Pulp stock enters the sand cleaner 62 through an inlet 64 and cleaned stock exits through outlet 66. The cleaners are a plurality of 8" diameter centrifugal cleaners 68 with spiral inlets 70, tapering to ¾" outlets 72. Sand passes to the reject outlet 74, while cleaned stock passes through the center passage 76 of the centrifugal cleaner 68 and through outlet 66.

Figure 6:
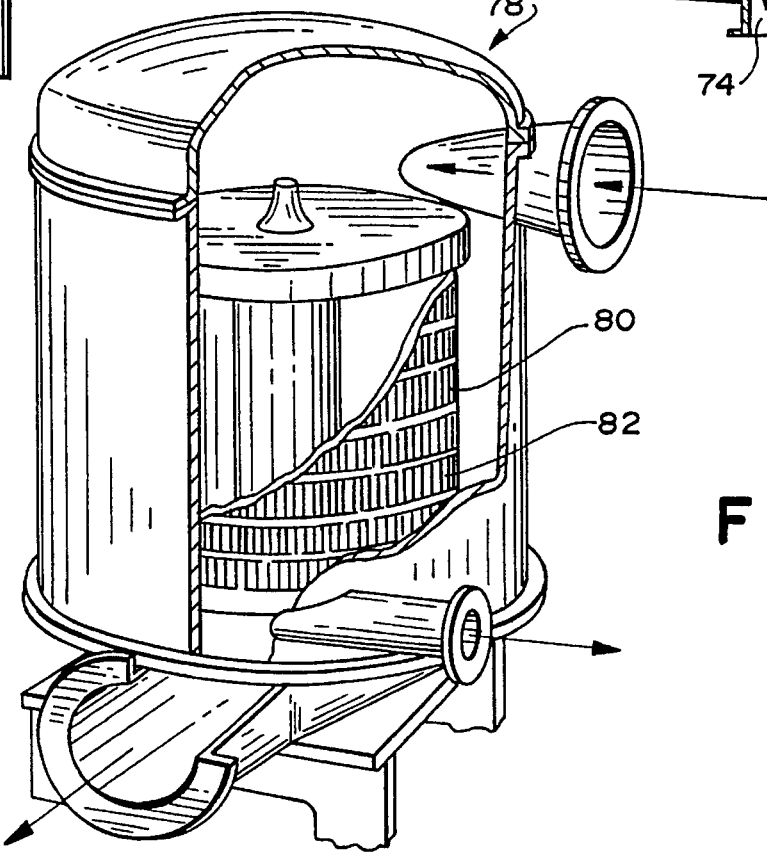
FIG. 6 is a side broken-away view of a slotted screen cleaner.

The fine slotted screen cleaner 78, shown in FIG. 6, is generally of the same design as coarse screen cleaners 50 and 52 as shown in FIG. 4. The primary difference is the form of the screen itself. Rather than holes 2–3 mm in diameter, screen 80 has elongated slots 82, 0.15–0.25 mm in width, for removing smaller particles.

Figure 7:
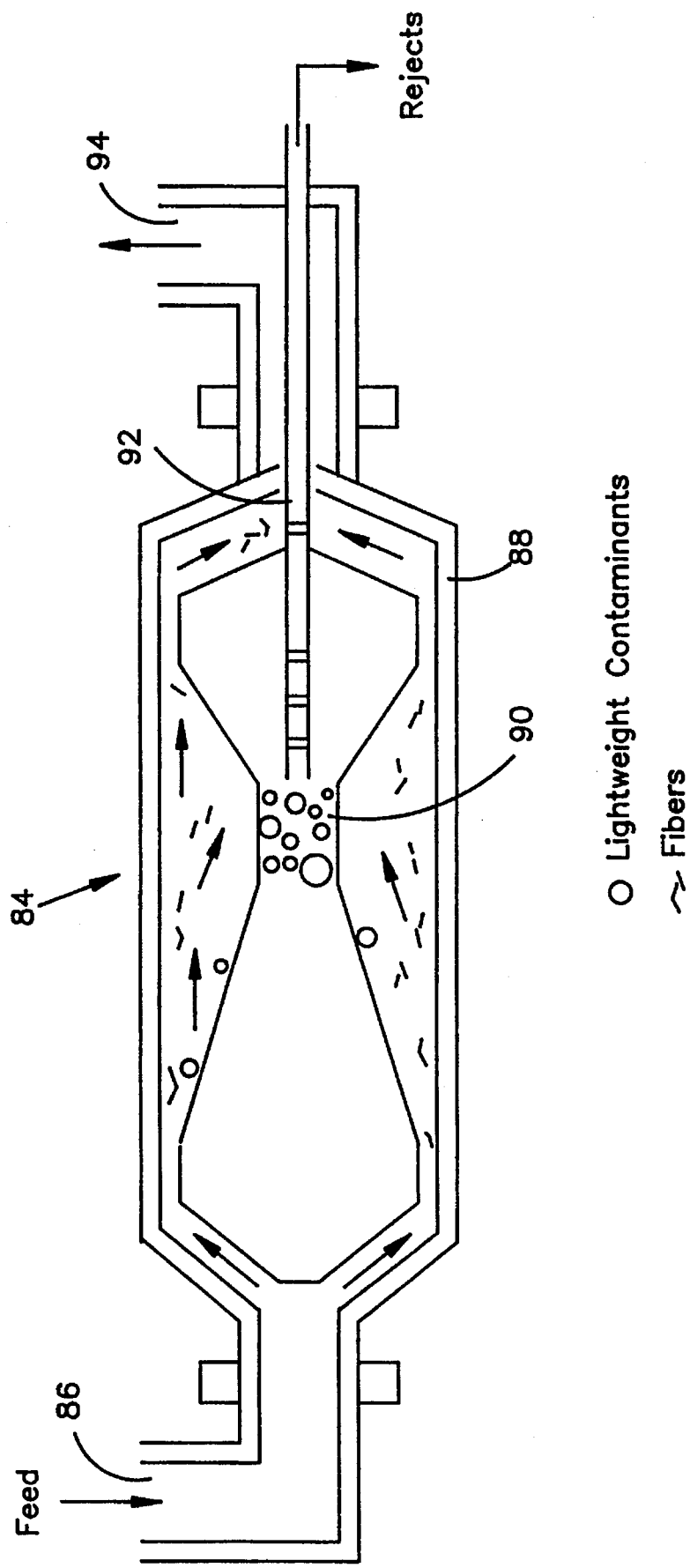
FIG. 7 is a cross-sectional view of a Gyroclean light density cleaner.

The final stage in the cleaning process is a centrifugal cleaner 84, (Gyroclean) shown in FIG. 7, a rotary cleaner which employs centrifugal force to separate fiber stock from lightweight contaminants such as polystyrene, polypropylene, stickies and hot melts. Fiber stock is directed through an inlet 86 into a stainless steel shell 88 rotating at a speed sufficient to create 700 G's of centrifugal force. Fibers are forced to the edges of the shell while the lighter contaminants move to a low pressure zone 90 in the center of the shell. The contaminants and air separated from the stock are removed through a centrally located axial outlet tube 92. The fiber stock is removed through an outer concentric outlet 94, and a portion of the fiber stock may be recycled to centrifugal cleaner 84 for further treatment.

The screening and cleaning sequence described removes substantially all solid contaminants, although a few small particles of plastic, adhesive and ink pigments may remain along with a fiber stock at about 1% solids consistency. The fiber stock is dewatered with a thickener apparatus to about 3.5–4% solids, and a screw press or other device increases the solids to about 30–60%. In this state, the stock is a wet, friable pulp, with a water content close to that of fresh wood chips.

The apparatus units described hereinabove and shown in FIGS. 2–7 are typical of the apparatus commercially available which can be used to practice the invention. However, other commercially available equipment suitable for the intended purposes and in accordance with the requirements of the invention, may be substituted for the apparatus described and shown.

The wet, recycled pulp is next charged into digestion equipment known to the industry as chip digesters. Either batch or continuous digesters may be used. However, the dewatered recycle pulp may be delivered from the final dewatering equipment into a live-bottom storage bin pending digester loading demand.

A live bottom bin discharge screen deposits the wet, recycle pulp onto a chip conveyor belt for digester deposit.

Digester cooking simultaneously accomplishes several objectives. First, the remaining contaminants are either reactively dissolved or physically changed in the harsh caustic chemical environment. For example, heavy metal contaminants in solution are precipitated to their sulfide salts through the action of the alkaline Kraft cooking liquor. These contaminants that are dissolved or suspended in the liquid phase are separated from the wood fiber with the spent or "black" cooking liquor in the pulp washing sequence which may include a multiplicity of cascaded washers.

Another objective served by cooking the recycle pulp is to remove as much of the remaining natural lignin as practical thereby reducing the subsequent bleach plant load. Such lignin, which is hydrolyzed by the caustic cooking process, is also washed from the wood fiber with the black liquor. When evaporatively concentrated, the extracted lignin fuel value contributes favorably to the overall plant heat requirements. This favorable black liquor fuel value contribution is realized by burning a 60% to 75% solids concentration of the black liquor as fuel for a steam generating, chemical recovery furnace.

The cooking conditions are selected to achieve the desired results. For example, an effective alkali charge may range from 8% to 25% on a dry fiber weight basis, and residence time, i.e. holding time at target temperature, may vary from 15 to 120 minutes at about 121°–150° C. An effective liquor-to-fiber weight ratio may be found from 3.0:1 to 12.0:1. Higher liquor-to-fiber ratios within the preferred range tend to cook more uniformly due to improved convective circulation of the cook mixture within the digester. Currently, it is preferred to cook at a target temperature of 45° C. for about 75 minutes at a liquor:fiber ratio of 10.5:1 (oven-dried fiber), and 20% alkali by weight of dry fiber. The overall cooking conditions (time, temperature, alkali concentration) are milder than would be used for wood chips, as the lignin of the recycle fiber has already been partially digested.

Following the same process sequence as digested wood chips, the digester is discharged into a blow tank. Concentrated black liquor is drained from the pulp batch which is reslurried with stock wash water. Thereafter the batch of recycled fiber is washed of remaining black liquor over a multiplicity of drum washers connected in cascaded flow sequence.

After washing, the pulp batch, now characterized as "brown" stock, is again screened for small contaminants and dewatered. Remaining fiber is prepared for bleaching by one of the traditional chlorine, chlorine dioxide, peroxide or caustic process sequences or one of the newer oxygen processes. It should be noted, however, that fluidized or solubilized "stickies" remaining in the pulp mass at this point tend to precipitate under a strong pH swing of the pulp mass from alkali to acid. The traditional chlorine bleaching sequence encourages such precipitation thereby improving the probability that such dissolved stickies will be removed over a final screen pass.

Bleaching solubilizes and reacts the final lignin traces from what began as recycled high yield paper. Of corresponding importance obtained from the bleach sequence is final, biological sterilization resulting from bleaching. Moreover, all remaining ink pigment is oxidized.

Depending upon particularized stock preparation, this recycled, cleaned, screened and bleached fiber is now ready for paper machine furnish preparation.

The stock produced by the process of the invention has sufficient purity to be used as a sole source for the production of paper, its purity being substantially the same as virgin pulp. However, recycled fiber will rarely be used as a sole source in papermaking as it results in a paper with too many surface imperfections, 100% recycle being roughly equivalent to 60% pine. The addition of hardwood pulp is generally necessary for satisfactory finish. In general, a paper produced by the invention will contain about 5 to 50% by weight recycled material, with the recycled material being at least half corrugated paperboard.

EXAMPLE 1

About 5400 pounds of old corrugated containers in the form of bales is added to a 25 m$^3$ Helico batch pulper which re-slurries the OCC with about 6000 gallons water to give a consistency of about 12%. After about 45 minutes agitation, a slurry is formed with a temperature of about 49° C. (120° F.). The pulper is drained into the detrasher and the pulp diluted to about 3–4% consistency with about 16,000 gallons of water. The stock passes through a screen with 6 mm holes and into a suction pump. The screen is cleaned with a foil shaped rotor without cutting debris trapped in the screen.

The detrashed pulp stock passes to a high density cleaner, at 2–4% acceptable consistency. The feed rate is about 500 gallons/minute and the reject rate about 1–2% by weight.

The accepts from the high density cleaner are passed to a primary tangential flow coarse screen cleaner with 2.4 mm holes, at about 2.5–3.5% consistency. The rejects are passed to a secondary coarse screen cleaner with 2.4 mm holes with dilution to 1.5–2.5% consistency. Accepts from both coarse cleaners are combined and diluted to about 1% consistency for passage through a centrifugal sand cleaner.

Accepts from the sand cleaner are passed at about 0.65% consistency to a tangential flow fine slotted screen cleaner with 0.008" slots. The screened accepts are then passed to a Gyroclean feed tank at about 0.8% consistency. The accepts from the Gyroclean cleaner are split, with about half recycled to the Gyroclean cleaner, and about half being dewatered.

Dewatering occurs utilizing a Hydrosieve stationary, three slope, self-cleaning screen assembly, normally referred to as a thickener. Flow proceeds over the top of a weir and down a sloped screen, with thickened stock being retained on the top of the screen and dropping into the feed tank of a screw press at 3.5–4.5% consistency. The screw of the press is surrounded by a self-cleaning perforated screen. The combination of decreasing screw pitch and increasing shaft diameter increases pressure along the shaft axis, forcing liquid through the screen. The final consistency is about 35–40%, and the stock is passed to a silo for storage.

EXAMPLE 2

Recycled pulp derived from OCC was purchased from a commercial source, the fiber being sold as "clean", meaning contaminant removal has taken place in the processing. Such fiber would ordinarily be digested and bleached, and the bleached pulp added to virgin pulp in a papermaking machine.

A sample of the commercial fiber was repulped and used to prepare handsheets pressed according to TAPPI Standard T-205, but dried on a steam heated drum at 121°–127° C. (250°–260° F.).

Another sample of fiber was produced by the method of the invention from OCC, using the various steps of pulping, cleaning and dewatering, as described in Example 1. This fiber was repulped and a handsheet prepared by the same method.

These handsheets were analyzed by dipping in Parker Quick Ink which dyes the cellulose fiber but not the hot melts and plastics. The undyed areas appear brown against a dark blue background. The dyed handsheets were air dried in rings between two filter papers.

The undyed area of the handsheets was determined using an Optomax Speck-Check scanner based image analyzer. Only the felt side of the sheets was analyzed to avoid counting contaminated areas twice. The Optomax Scanner was used in inverted video mode to count the light brown spots against the dark background. A template of black cardboard with a hole cut the size of a round TAPPI Standard T-205 handsheet was used to prevent paralyzing the scanner with the high contrast of the dark handsheet against the normal white background of the scanner cover.

The size classifications used were not TAPPI standard but were adjusted to give a parts per million count of zero for virgin pine and hardwood (no contaminants) and to include very large particles for very contaminated samples. The following twelve size classes in square millimeters were used: 0.3–0.4, 0.4–0.6, 0.6–0.8, 0.8–1.0, 1.0–1.5, 1.5–2.0, 2.0–3.0, 3.0–4.0, 4.0–5.0, 5.0–10.0, 10.0–15.0, 15.0–25.0.

Figure 8:
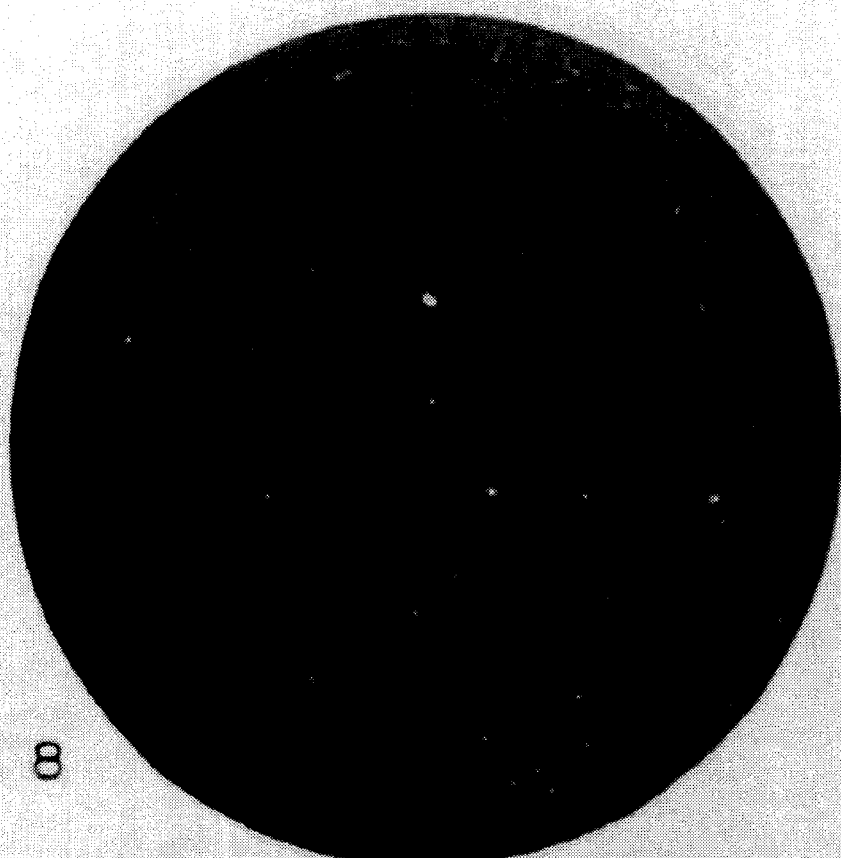
FIG. 8 is a photograph of a handsheet produced from commercial recycled pulp.
Figure 9:
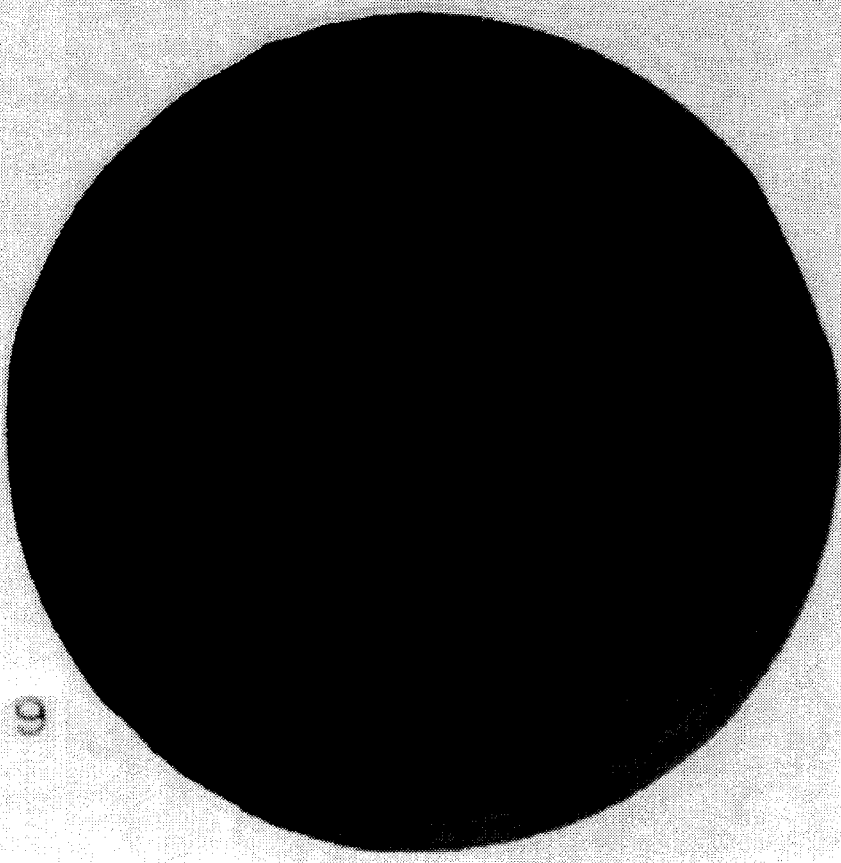
FIG. 9 is a photograph of a handsheet produced from recycled pulp cleaned by the process of the invention.

Photographs of the dyed handsheets are shown in FIG. 8 (commercial pulp) and FIG. 9 (pulp produced by method of invention).

The results of the analyses are set forth in Table 1 below:

TABLE 1

| Size Range | | | |
|---|---|---|---|
| Lower Limit mm² | Upper Limit mm² | Commercial Pulp Total Count | Invention Total Count |
| less than | 0.30 | 192 | 48 |
| 0.30 | 0.40 | 10 | 0 |
| 0.40 | 0.60 | 14 | 0 |
| 0.60 | 0.80 | 0 | 0 |
| 0.80 | 1.00 | 1 | 0 |

TABLE 1-continued

| 1.00 | 1.50 | 1 | 0 |
|---|---|---|---|
| 1.50 | 2.00 | 1 | 0 |
| 2.00 | 3.00 | 2 | 0 |
| 3.00 | 4.00 | 0 | 0 |
| 4.00 | 5.00 | 0 | 0 |
| 5.00 | 10.00 | 0 | 0 |
| 10.00 | 15.00 | 0 | 0 |
| 15.00 | 25.00 | 0 | 0 |
| 25.00 | 50.00 | 0 | 0 |
| 50.00 | 75.00 | 0 | 0 |
| 75.00 | 100.00 | 0 | 0 |
| 100.00 | or greater | 0 | 0 |

| Results Summary | | |
|---|---|---|
| | Commercial Pulp | Invention |
| Number of scans. | 1 | 1 |
| Number of objects within size range >0.3 mm². | 29 | 0 |
| Mean of scan >0.3 mm². | 1482.92 ppm | 0 |
| Total area of fields measured. | 12597.79 mm² | 12597.79 mm² |
| Total area of all objects detected. | 43.47 mm² | 5.73 mm² |
| Area fraction of detected objects. | 3450 ppm | 450 ppm |

The pulp sample processed according to the invention was found to be totally free of visible surface contaminants greater than 0.30 mm² in size, and had an overall contamination about 13% of the commercially obtained pulp sample.

EXAMPLE 3

60,000 pounds of pulp stock from Example 1 are added to a digester with a mixture of white and black liquor at a pulp:liquor ratio of 10.5 and 20% alkali by weight of dry fiber. The liquor mixture includes about 4100 gallon white liquor and about 11,900 gallon black liquor, the black liquor containing some residual alkali, but serving largely as a diluent to arrive at the desired liquor:fiber ratio. Cooking takes place at 145° C. for about 75 minutes at the target temperature, 120 minutes overall cook. The cooked pulp stock is cleaned on a series of screen washers and bleached with chlorine, peroxide and chlorine dioxide, sequentially.

EXAMPLE 4

Trial Run 1

A paper machine trial run was made for about 2 ¼ hours wherein the decontaminated recycled fiber produced in accordance with the invention was put in the headbox at a 5 weight percent level and was worked up in increments of 5 percent to 30 percent level. Trial reels of 0.018" bleached blade coated paper were made at the 10 percent and 30 percent recycled fiber levels. Comparing the trials with 10 percent and 30 percent recycled fiber content with the controls (regular production made prior to and after the trials), dirt levels were comparable with visual smoothness going from a grade one to a two at the 30 percent recycled fiber level and continuing for some time after the recycled fiber had been removed from the paper machine headbox. Smoothness numbers were generally higher on the trials in comparison to the controls. Results are shown in the Table headed Trial Run 1.

Trial Run 2

A paper machine trial run was made for about 1 ½ hours wherein the decontaminated recycled fiber produced in accordance with the invention was put in the headbox at a 5 percent level and was subsequently raised to 12 percent. Six reels of 0.104 coated aseptic (FDA) grade bleached board were produced.

Comparing the trial with 12 percent recycled fiber with the control (regular production made after the trial), the trial had comparable dirt and visual smoothness levels. Results are shown in the Table headed Trial Run 2.

Comparing all test values between the trial and control, the trial showed edge wick, curl, brightness, and folds to be higher with bond, ZDT stiffness, and IGT being lower. The lower strength values may have been influenced by a lower internal bond trial that was to follow the recycle fiber trial portion of the run and the machine control system was making adjustments for this.

Machine operators commented that no difference was seen on the paper machine comparing the recycle fiber trial with regular production made prior to and after the trial.

Trial Run 3

A paper machine trial run was made for about 1 ½ hours wherein decontaminated bleached recycled fiber produced in accordance with the invention was put in the headbox and controlled at a 10 percent level for the entire run. A total of 20 tons of trial 0.012" blade coated offset board was made with a 10 percent recycled fiber content.

Comparing the trial made with 10 percent recycled fiber content with the control (regular production made prior to the trial), visual smoothness and dirt levels were comparable between the two. See the results in the table headed Trial Run 3.

Comparing other test values between the trial and control, the trial showed a higher density, bond, IGT, and MD stiffness with caliper, and brightness being lower.

The furnish used on the trial had more pine in comparison to the regular production made prior to the trial. This was intentional because of a refiner problem occurring and the higher pine content was to ensure meeting the internal bond specification.

Trial Run 4

A paper machine trial run was made for about 1 ¼ hours wherein decontaminated bleached recycled fiber produced in accordance with the invention was put in the headbox and controlled at a 10 percent level for the entire run. A total of nine tons of trial 0.020" blade coated ovenable board was made for evaluation of conversion to frozen food containers.

Comparing the trial made with 10 percent recycled fiber content with the control, which consisted of twelve reels of regular production made prior to the trial, visual smoothness was higher on the trial with dirt levels being comparable between the two. See the results in the table headed Trial Run 4.

Comparing other test values between the trial and control, the trial showed a higher ZDT with the Color, b value being lower. Other test averages were fairly comparable between the two.

Trial Run 1

| | Dirt Levels | | | |
|---|---|---|---|---|
| | Regular Test Average | TAPPI Average | Visual Smoothness Average | Furnish Recycled Fiber |
| Control | | | | |
| Prior to Trials | 1 | 4 | 1-1-1 | — |
| Trial 10% Recycled | 1 | 4 | 1-1-1 | 10% |
| Trial 30% Recycled | 1 | 5 | 2-2-2 | 30% |
| Control After Trials | 1 | 5 | 2-2-2 | — |

Trial Run 2

| | Dirt Levels | | | |
|---|---|---|---|---|
| | Regular Test Averages | TAPPI Ranges / Average | | Visual Smoothness Average | Furnish Recycled Fiber |
| | Averages | Ranges | Average | Average | Fiber |
| Control | 1 | 6–10 | 8 | 2-2-2 | — |
| Trial | 1 | 5–10 | 7 | 2-2-2 | 12% |

Trial Run 3

| | Dirt Levels | | | | |
|---|---|---|---|---|---|
| | Regular Test | TAPPI | | Visual Smoothness | Furnish Recycled |
| | Averages | Ranges | Average | Average | Fiber |
| Control | 1 | — | 7 | 2-2-2 | — |
| Trial | 1 | — | 7 | 2-2-2 | 10% |

Trial Run 4

| | Dirt Levels | | | | |
|---|---|---|---|---|---|
| | Regular Test | TAPPI | | Visual Smoothness | Furnish Recycled |
| | Averages | Ranges | Average | Average | Fiber |
| Control | 1 | 3–9 | 6 | 2-2-2 | — |
| Trial | 1 | — | 7 | 4-3-4 | 10% |

EXAMPLE 5

65,000 pounds of pulp produced according to the invention from OCC was added to a digester with 4,000 gallons white liquor and 11,000 gallons black liquor. The batch was cooked for 2 hours reaching a maximum temperature of 143°–144° C. (289°–292° F.) at 44 PSIG for 75 minutes. Steam was added after the cook to blow the digester clean over a 9 minute period. The cooked pulp was screened and bleached, and combined in an amount of 20% by weight with virgin hardwood cooked pulp. The combined pulp was run on a paper machine to produce 3 reels of a coated product. The coated product was examined for dirt according to TAPPI Standard T437 om-85, using an Optomax Speck-Check scanner to determine dirt spots on a white background. The results were compared with the results from reels produced on the paper machine before and after the test runs, the comparative reels using pulp containing virgin fiber. These test results are set forth below.

|  | Dirt >0.3 mm² - Average PPM per Unit Area | Coater Blade Scratches |
| --- | --- | --- |
| 12 reels before | 4.8 | 0 |
| 3 reels 20% recycled OCC | 5.5 | 0 |
| 26 reels after | 5.0 | 0 |

While the paper containing recycled OCC was marginally higher in dirt content, it was well within standards for producing an acceptable commercial product at high speeds without streaks or scratches.

EXAMPLE 6

60,000 pounds of recycled OCC pulp produced according to the invention was added to a digester with 4,000 gallons white liquor and 12,000 gallons black liquor. The batch was cooked for 2 hours, reaching a maximum temperature of 135° C. (275° F.) for 75 minutes. The ratio of total liquid:dry fiber was 10.5. Steam was added after the cook to blow the digester clean over a 9 minute period. The cooked pulp was screened and bleached, and combined in an amount of 10% by weight with virgin hardwood cooked pulp. The combined pulp was run on a paper machine to produce 2 reels of coated product which was examined for dirt according to TAPPI Standard T437 om-85, as previously described. Comparative test results are set forth below.

|  | Dirt >0.3 mm² - Average PPM per Unit Area | Coater Blade Scratches |
| --- | --- | --- |
| 9 reels before | 7.5 | 0 |
| 2 reels - 10% recycled OCC | 7.5 | 0 |
| 9 reels after | 3.7 | 0 |

The test results of the product containing recycled OCC are essentially the same as the test results of the product produced prior to addition of the recycled OCC. All products are well within an acceptable commercial range.

What is claimed is:

1. A fiber pulp for a generally streak and scratch-free blade-coated paper from a furnish having at least 10% by weight of said fiber pulp produced from recycled paper substantially comprised of recycled corrugated containers, said fiber pulp containing less than about 20 ppm per unit area of solid, non-fibrous contaminants of a size greater than 0.05 mm², said fiber pulp being produced from said recycled paper by a method comprising the steps of:
   a) combining a quantity of paper substantially comprised of corrugated containers to be recycled, containing lignin, cellulosic fibers and solid non-fibrous contaminants, with an aqueous liquid to form a slurry containing about 9–15% by weight solids and agitating said slurry in a low shear mixer at a temperature of less than 65.6° C. for a time sufficient to separate said lignin and cellulosic fibers from said solid contaminants without significantly degrading said solid contaminants, and then sequentially;
   b) removing from said slurry gross contaminants of a size in a range greater than about 5 mm² by passing said slurry through holes of a predetermined diameter;
   c) removing from said slurry contaminants having a specific gravity in a range greater than 1;
   d) removing from said slurry intermediate contaminants having a size in a range greater than about 2 to 3 mm² by passing said slurry through holes of a predetermined size;
   e) removing sand from said slurry;
   f) removing from said slurry fine contaminants of a size in a range at least about 0.15 mm², by passing said slurry through elongated slots of a predetermined width;
   g) removing from said slurry by centrifugal means contaminants having a specific gravity less than 1;
   h) dewatering said slurry to form a wet, friable pulp having a moisture content of about 30–60%;
   i) digesting said pulp in a cooking liquor for a time and at a temperature sufficient to hydrolyze a substantial portion of said lignin remaining in intimate association with said cellulosic fibers wherein said digesting takes place at a target temperature in a range of 121°–150° C.; and
   j) separating said digested pulp from spent cooking liquor.

2. A paper for a streak and scratch-free blade-coated paper, which paper is produced from a furnish having at least 10% by weight of fiber pulp produced from recycled paper substantially comprised of recycled corrugated containers, said paper having less than about 20 ppm per unit area solid, non-fibrous contaminants of size greater than 0.05 mm², and said fiber pulp being produced from said recycled paper by a method comprising the steps of:
   a) combining a quantity of paper substantially comprised of corrugated containers to be recycled, containing lignin, cellulosic fibers and solid non-fibrous contaminants, with an aqueous liquid to form a slurry containing about 9–15% by weight solids and agitating said slurry in a low shear mixer at a temperature of less than 65.6° C. for a time sufficient to separate said lignin and cellulosic fibers from said solid contaminants without significantly degrading said solid contaminants, and then sequentially:
   b) removing from said slurry gross contaminants of a size in a range greater than about 5 mm² by passing said slurry through holes of a predetermined diameter:
   c) removing from said slurry contaminants having a specific gravity in a range greater than 1;
   d) removing from said slurry intermediate contaminants having a size in a range greater than about 2 to 3 mm² by passing said slurry through holes of a predetermined size;
   e) removing sand from said slurry;
   f) removing from said slurry fine contaminants of a size in a range at least about 0.15 mm², by passing said slurry through elongated slots of a predetermined width;
   g) removing from said slurry by centrifugal means contaminants having a specific gravity less than 1;
   h) dewatering said slurry to form a wet, friable pulp having a moisture content of about 30–60%;
   i) digesting said pulp in a cooking liquor for a time and at a temperature sufficient to hydrolyze a substantial portion of said lignin remaining in intimate association with said cellulosic fibers wherein said digesting takes place at a target temperature in a range of 121°–150° C.;
   j) separating said digested pulp from spent cooking liquor; and
   k) preparing paper from said separated pulp.

3. The paper of claim 2, containing less than 10 ppm solid contaminants.

4. The paper of claim 2, containing at least 20% recycled paper.

5. The paper of claim 2 which is a bleached paper.

* * * * *